United States Patent [19]

Jarvis et al.

[11] Patent Number: 4,728,701

[45] Date of Patent: Mar. 1, 1988

[54] PROCESS FOR THE POLYMERIZATION OF ACRYLATES

[76] Inventors: Marvin A. Jarvis, 301 S. Salem Hills, Elk Ridge, Utah 84561; Lawrence A. Testa, Candlewood Isle, P.O. Box 128, New Fairfield, Conn. 06810

[21] Appl. No.: 782,517

[22] Filed: Oct. 1, 1985

Related U.S. Application Data

[63] Continuation of Ser. No. 533,455, Sep. 19, 1983, abandoned.

[51] Int. Cl.$^4$ ............................................. C08F 2/06
[52] U.S. Cl. ................................. 526/65; 526/328; 526/329.7; 528/481; 528/501
[58] Field of Search ............... 526/65, 328, 329.7; 528/481, 501

[56] References Cited

U.S. PATENT DOCUMENTS

| | | | |
|---|---|---|---|
| 3,201,365 | 8/1965 | Charlesworth | 528/501 |
| 3,252,950 | 5/1966 | Terenzi | 526/65 |
| 3,474,081 | 10/1969 | Bosworth | 526/329.7 |
| 3,968,059 | 7/1976 | Shimada | 526/65 |
| 4,153,501 | 5/1979 | Fink | 528/501 |
| 4,407,989 | 10/1983 | Takao | 528/501 |

FOREIGN PATENT DOCUMENTS

DD150617  9/1981  Fed. Rep. of Germany .

Primary Examiner—Paul R. Michl
Attorney, Agent, or Firm—Plante, Strauss, Vanderburgh

[57] ABSTRACT

The continuous solution polymerization of an acrylate, particularly methyl methacrylate, is practiced in the presence of a large quantity of solvent by introducing the monomer feed into a continuous loop of recycled solvent and removing the polymerized product therefrom. The polymerization is practiced in a plurality of stages, preferably two stages wherein the bulk of the polymerization is performed in the first stage and the final stage is operated to deplete the initiator and any other polymerization modifiers, thereby forming a crude polymerizate for devolatilization. A product of superior thermal stability and optimum heat distortion temperature is achieved by the addition of some of the comonomer such as methyl acrylate, or ethyl acrylate, etc., to the final stage or stages of the polymerization. Additionally, the product quality is enhanced by addition of a portion of the chain transfer agent, such as n-dodecyl mercaptan, to the final stage or stages of polymerization. The crude polymerizate is preheated and devolatilized in a flash zone. Sufficient pressure is maintained on the crude polymerizate in the devolatilizer preheater to avoid the formation of foam encrustations on the heat exchange surfaces of the devolatilizer preheater and on the surfaces of the transfer lines.

22 Claims, 1 Drawing Figure

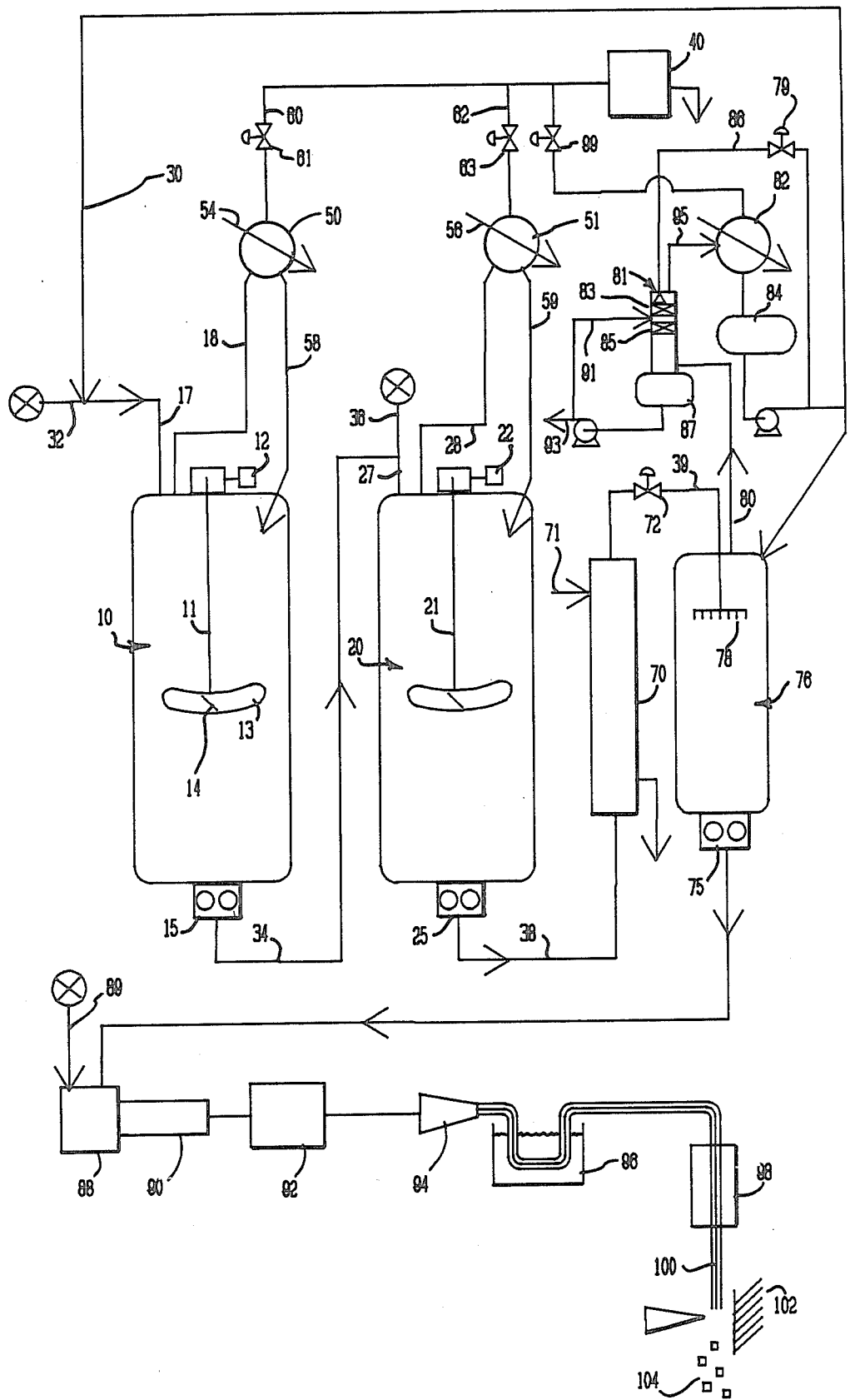

PROCESS FOR THE POLYMERIZATION OF ACRYLATES

RELATED APPLICATIONS

This application is a continuation of our copending application, Ser. No. 533,455, filed Sept. 19, 1983, now abandoned.

BACKGROUND OF THE INVENTION

Brief Statement of the Prior Art

One of the difficulties experienced with the polymerization of methyl methacrylate is that the polymerization becomes uncontrollable when the crude polymerizate exceeds a critical polymer solids concentration. For this reason, prior polymerization processes have avoided bulk polymerization and much of the poly(methyl methacrylate) marketed today is produced by suspension polymerization.

Methyl methacrylate is commonly copolymerized with a limited amount of copolymerizable monomers (comonomers) such as methyl acrylate and ethyl acrylate. These comonomers stabilize the polymer, particularly against depolymerization, which can occur when the polymer chains terminate in unsaturated carbon atoms. The latter results from termination by disproportionation and, accordingly, an objective of the prior art has been to effect chain termination by free radical coupling rather than by disproportionation. This is achieved by incorporating in the polymerization zone a limited quantity of a chain transfer agent such as an alkyl mercaptan, e.g., n-dodecyl mercaptan. The chain termination by free radical coupling to an alkyl mercaptan, however, forms a mercaptan free radical which can re-initiate polymerization, resulting in a polymer chain having a mercaptan terminal group.

Poly(methyl methacrylate) is commonly produced by a suspension process because of the difficulties experienced with solvent or bulk polymerization of this monomer. One of the major difficulties limiting the use of mass polymerization is that the polymerization becomes uncontrollable when the polymerizate reaches a gel condition, typically at solids concentrations above a value which commonly is from 30 to about 40 weight percent. Although solvent polymerization could be used to obviate this difficulty, prior investigators have not developed an efficient method or the equipment required for the devolatilization of large quantities of solvent from the crude polymerizate, preferring instead to use suspension or block polymerization or other techniques, all of which lack in efficiency and/or product consistency. When solvent is present in the crude polymerizate it causes severe foaming during devolatilization and this foaming obstructs efficient heat transfer and devolatilization. Further, the polymer readily discolors if contacted with heat transfer surfaces at temperatures in excess of approximately 270 degrees C. These characteristics interfere with efficient heat transfer and have, heretofore, precluded the successful commercialization of continuous, solution polymerization of acrylate esters such as methyl methacrylate.

BRIEF DESCRIPTION OF THE INVENTION

This invention comprises a process for the continuous mass polymerization of methyl methacrylate, preferably in the presence of limited amounts of comonomers such as ethyl acrylate and methyl acrylate. The polymerization is conducted in a plurality of stages; most of the polymerization is effected in the early stages, and the latter stages serve to complete the polymerization and deplete residual initiators and/or modifiers. The polymerization is also conducted in the presence of chain transfer agents which enhance the properties of the final product and these additives are preferably introduced into all stages. The crude polymerizate from the final stage is passed to a preheater in the devolatilization section and is there heated while under a sufficient pressure to maintain an appreciable liquid phase and to suppress the formation of solid, foam encrustations on the heat transfer surfaces of the heating equipment. The crude polymerizate is heated sufficiently in the preheater to supply the heat of vaporization needed for the effective devolatilization of the solvent, unreacted monomers and low boiling polymer products. The preheated, crude polymerizate is transferred into a devolatilization zone where the pressure is reduced to flash the solvent, unreacted monomers and lower molecular weight polymer from the polymer product. The vaporized solvent and monomers are purified of contaminants, cooled, condensed and recycled on a continuous basis to the first reaction stage, completing a circulation loop of recycled solvent and monomers. The majority of the methyl acrylate or ethyl acrylate comonomer and chain transfer additives, e.g. 75 percent, used in the process are introduced into the first stage with the methyl methacrylate feed. The remainder are introduced into the latter stages of polymerization to ensure that the polymerization in the latter stage proceeds under conditions which are conductive to formation of a homogeneous copolymer with superior properties such as thermal stability and heat distortion temperature.

The polymerization is preferably conducted in continuously stirred tank reactor vessels (CSTR) under sufficient agitation to provide a homogeneous reacting mass in each of the reactors. The exothermic heat of polymerization is removed, preferably by reflux cooling and, for this purpose, the reactors are maintained at precisely controlled pressures, to maintain boiling of the polymerizing reaction mass. The vapors are withdrawn from the reactor, cooled, condensed and returned as a reflux stream. This method of polymerization ensures precise control of the polymerization conditions such as temperature and permits manufacture of a product having the desired molecular weight within relatively narrow limits of variation (molecular weight distribution).

BRIEF DESCRIPTION OF THE DRAWINGS

The invention will be described with reference to the FIGURE which is a schematic process flow diagram of the method.

DESCRIPTION OF PREFERRED EMBODIMENTS

The invention relates to the polymerization of acrylic monomers, in particular, the polymerization of monomers such as the acrylate and methacrylate esters of alkanols or halogen substituted alkanols having from 1 to about 18 carbons, e.g., methyl arcylate, ethyl arcylate, methyl methacrylate, propyl acrylate, n-butyl methacrylate, n-hexyl acyrlate, chloroethyl acrylate, n-octyl methacrylate, stearyl acrylate, alone, or in admixture to produce homo or copolymers. Other common comonomers which can be included in amounts from 1 to about 60 weight percent include acrylonitrile, styrene, maleic anhydride, alpha-methyl styrene, and mixtures thereof.

The polymerization is preformed in the presence of sufficient solvent to avoid the viscosity of the crude polymerizate rising above a value where the polymerization becomes uncontrollable. This is usually expressed in terms of solid content and sufficient solvent is used to maintain the solids content of the crude polymerizate below 50 weight percent, preferably below 40 weight percent. For this purpose, any low boiling point solvent can be used such as saturated and aromatic hydrocarbons which are exemplified by hexane, heptane, octane, benzene, toluene, xylene, cyclohexane, cyclodecane, isoctane, and mixtures thereof such as naphtha, etc. Generally solvents having atmospheric boiling points from about 40 to about 225 degrees C., preferably from about 60 to about 150 degrees C. are useful. It is preferred to use a solvent having a boiling point temperature close to that of the major monomer, e.g., methyl methacrylate, to avoid the necessity of intermediate fractionation of the recycled mixture of monomer and solvent. When these have close boiling point temperatures, the mixture has a narrow boiling point range, lessening the opportunity for inclusion of contaminates in the recycle mixture.

It is also preferred to conduct the polymerization in the presence of a free radical chain transfer agent to minimize the concentration of the polymer chains containing terminally unsaturated carbons. For this purpose, a free radical chain transfer agent is employed. Free radical chain transfer agents which are useful are compounds which release a hydrogen atom onto the polymer chain, terminating its polymerization in a saturated carbon end group and forming a free radical which can re-initiate polymerization or combine with another free radical to form a stable byproduct. Examples of suitable chain transfer agents include sulfur compounds such as the alkyl and arylalkyl mercaptans having from about 5 to about 18 carbons, e.g., amyl mercaptan, heptyl mercaptan, iso-octyl mercaptan, decyl mercaptan, n-dodecyl mercaptan, phenylethyl mercaptan, hexadecyl mercaptan, stearyl mercaptan, etc.

Other compounds which are useful chain transfer agents are those having a structure which stabilizes a free radical and include aromatic hydrocarbons of 6 to about 18 carbons, and halo, amino or imido substituted alkanes or aromatics having from 1 to about 18 carbons. Examples of suitable aromatic hydrocarbons are benzene and $C_1$-$C_6$ alkyl benzenes, e.g., toluene, ethylbenzene, xylene, propylbenzene, isobutylbenzene, isopropyl toluene, diisopropyl benzene, triethyl benzene, etc. Examples of substituted hydrocarbons are compounds having from 1 to about 18 carbons and from 1 to about 6 halo, amino or imido groups, e.g., carbon tetrachloride, dichloroethane, trichloroethane, difluoro-propane, fluorodichlorobutane, dichloro-isopentane, bromocyclohexane, methylamine, isopropylamine, t-butylamine, dodecylamine, 2,4-diaminooctane, cyclopentylamine, methylcyclohexylamine, aniline, pyridylidene, piperozine, pyridine, dimethyl sulfoxide, etc.

A particularly useful selection of a chain transfer agent is one having a low boiling point, e.g., from 60 to about 150 degrees C. since such compounds can also function as the solvent, alone, or in combination with any of the aforementioned solvents.

The concentration of the chain transfer agent employed depends on the particular agent selected. The sulfur compounds or mercaptans are used at concentration from about 0.1 to about 1.0, preferably from about 0.2 to about 0.3 weight percent of the monomer and comonomer feed mixture. The alkylbenzenes, however, are used in much greater excess, particularly since these ingredients can also serve as the solvent for the process, alone or in admixture with other solvents.

Modifiers can also be included at concentrations from 2 to 50 weight percent to improve the impact strength of the finished polymer. These are elastomers such as ethylene-propylene diamine copolymer (EPDM), polybutadiene, styrene-butadiene copolymer, polyurethane, and ethylene propylene copolymer rubber (ETR). These modifiers can be included in the finished polymer, preferably by addition to the polymerization zone. The modifier can also be blended into the molten polymer or crude polymerizate during the product finishing steps of the process.

The invention is particularly suited for polymerization of methyl methacrylate, preferably in the presence of limited amounts of a comonomer such as ethyl acrylate or methyl acrylate in amounts from 0.1 to about 12, and preferably from 1 to about 6, weight percent of the resulting copolymer.

The polymerization of the aforementioned monomers is initiated with a free radical initiator and, for this purpose, any of a number of free radical precursors can be used as initiators. Examples of useful initiators are: dibenzoyl peroxide, dicumyl peroxide, 2,2'-azo(bis)isobutylnitrile, 2,2'-azobis(dimethylvaleronitrile), diethyl peroxide, distearyl peroxide, t-butyl peroxide, di(2,4-dichlorobenzoyl) peroxide, diacetyl peroxide, t-butyl perhenzoate, t-amyl peroctoate, 1,1-di(t-butylperoxy)cyclohexane, di(t-butyl)peroxide, dicumyl peroxide, etc. Of the aforementioned, 2,2'-azo(bis)isobutylnitrile, is preferred. The initiator can be employed at concentrations in the monomer feed mixture from about 0.01 to 1.0 weight percent, preferably from about 0.03 to about 0.5 weight percent, and most preferably from 0.07 to 0.10 weight percent.

Other useful additives for the process include peroxy free radical scavengers to preclude any formation of polymer that would include an oxy group. The presence of any significant amounts of polymer containing an oxy group is undesirable since such polymers have poor weather and thermal resistance and readily discolor. Significant amounts of oxy-substituted polymer can be precluded by including as an additive in the process a limited quantity of a peroxy free radical precursor such as: hindered phenol antioxidants, tetrakis[methylene(3,5-di-tert-butyl-4-hydroxyhydrocinnamate)]methane, thiodiethylene bis(3,5-di-tert-buty-4-hydroxyl)hydrocinnamate, 1,6-hexamethylene bis(3,5-tert-butyl-4-hydroxyhydrocinnamate, di-t-butyl-p-cresol octadecyl 3-(3',5'-di-tert-butyl-4'-hydroxyphenyl)propionate, tris(3,5-di-t-butyl-4-hydroxybenzyl)isocyanurate, 2,2'-methylene bis(4-methyl-6-butylphenol), and 3:1 condensate of 3-methyl-6-t-burylphenoz with crotonaldehyde.

Of the aforementioned, octadecyl 3-(3'3,5'-di-tert-butyl-4-hydroxyphenyl)propionate and tris(3,5-di-t-butyl-4-hydroxybenzyl) isocyanurate are the preferred additives as they do not interfere the polymerization. The aforementioned peroxy free radical scavengers are employed at concentrations from about 0.01 to about 0.5, preferably 0.1 to about 0.2, weight percent, based on the monomer feed mixture.

Referring not to the FIGURE, the process is practiced in two or continuously stirred tank reactors 10 and 20. Each reactor comprises a steel vessel with a centrally disposed propeller shaft 11 and 21 extending from a superimposed propeller drive and motor assembly 12 and 22. Each propeller shaft such as 11 supports one or more propellers formed of a plurality of radial blades 13 which be entirely radial, i.e., having no axial pitch, or can have a axial pitch, e.g., from about 5 to about 45 degrees, as shown in the side view of propeller blade 14. The propellers intimately admix the polymerization medium to form a homogeneous mass in each reactor.

Each tank reactor has a bottom discharge nozzle that, preferably, discharges directly into a closely coupled gear pump 15 and 25 such as commercially available polymer gear pumps. Each tank ractor has an inlet line 17 and 27 for introoduction of the polymerizable reactants. The recycle mixture comprising chiefly solvent is introduced through solvent recycle line 30 and the fresh feed mixture comprising the methyl methacrylate and limited allowance of comonomers, chain transfer agent, peroxide radical scavenger, etc. is introduced through line 32.

The crude polymerizate is transferred from the first tank reactor 10 through polymer gear pump 15 and transfer line 34 to the second tank reactor 20. Additional quantities of comonomers and, optionally, chain transfer agents are also introduced into tank reactor 20 through the delayed addition line 36.

The exothermic heat of polymerization is removed from the reactors 10 and 20 by reflux cooling. To this end, the tank reactors 10 and 20 are totally enclosed and are maintained at predetermined pressure. When subatmospheric pressures are required, a vacuum system is employed, generally indicated at 40. Each tank reactor has a vapor withdrawal line 18 and 28 which discharges into a shell and tube condenser 50 and 51. Cooling water is supplied to these condensers through lines 54 and 56 and the condensed reflux liquid is supplied to their respective reactors through reflux lines 58 and 59.

The heat exchangers 50 and 51 are connected to the pressure control system by vapor lines 60 and 62 which are provided with pressure control valves 61 and 63. These valves are controlled by a suitable pressure controller which maintains a predetermined pressure in each reactor. thereby providing a precise-control of the pressure in their respective tank reactors 10 and 20, and thus achieving a precise temperature control within these tank reactors. In practice, the temperatures within the first and second tank reactors can be controlled within a tolerance of 0.5 degrees C., a precision which gives very close control over the molecular weight and molecular weight distribution of the polymer produced in these reactors.

As previously mentioned, most of the polymerization is performed in the first tank reactor 10. Typically, from 20 to 95 percent, preferably 65 to 95, of the conversion of the monomer achieved in the process is accomplished in the first tank reactor. Generally, the temperature within this reactor is from 60 degrees to about 130 degrees C. and the particular temperature chosen is selected for the molecular weight and other properties desired in the final polymer product. tank reactor serves to complete the polymerization The second tank reactor serves to complete the polymerization and to deplete the crude polymerizate of any residual or unconsumed initiator. This is accomplished by providing an extended residence time to ensure that substantially all the initiator is consumed. For optimum properties of the final polymer, additional quantities of the comonomers, such as ethyl acrylate or methyl acrylate, are introduced into the second tank reactor together with the crude polymerizate transferred from the first tank reactor 10. Approximately 5 to about 50 percent, preferably about 25 percent of the total comonomers which are used in the process are introduced into the second tank reactor 20 through line 36. As previously mentioned, additional quantities of the chain transfer additive. e.g., n-dodecyl mercaptan, are also introduced into the second tank reactor 20. Approximately 5 to about 50 percent of the total chain transfer agent employed in the process, preferably about 25 percent, is introduced into the second tank reactor through line 36. The range of temperatures for this second tank reactor 20 is also from about 60 to about 130 degrees C.

The crude polymerizate withdrawn from the second tank reactor 20 is transferred by polymer pump 25 through transfer line 38 to the devolatilizer preheater 70. The crude polymerizate is preferably passed through the tubes of a shell and tube heat exchanger and is raised to a stock temperature between about 200–270, preferably between about 220–260 degrees C. in this exchanger by heat transfer with a heating fluid, e.g., a hot oil stream which is introduced into the shell side of the exchanger through line 71. The crude polymerizate which has been heated in heat exchanger 70 is transferred through transfer line 39 to the flash vessel 76 in the devolatilizer section. The transfer line 39 is provided with a back pressure control valve 72 which is responsive to the discharge pressure of polymer gear pump 25. The pressure which is maintained on the crude polymerizate is sufficient to maintain a mixed, two-phase system of liquid and vapors. In practice, a substantial portion of the solvent is maintained in liquid phase in preheater 70, thereby avoiding the formation of foam encrustations on the surfaces of the heat exchanger and permitting efficient heat transfer in the devolatilizer preheater. When excessive vaporization occurs in the heat exchanger, the crude polymer can become cooled to or below the temperature of its melting range, resulting in formation of a solid phase which quickly forms foam encrustations on the heat transfer surfaces. This is avoided by maintaining sufficient back pressure on the crude polymerizate in preheater 70.

The necessary back pressure for a crude polymerizate having any combination of monomer, comonomers, and solvent can be determined experimentally by heating a sample of the crude polymerizate to the inlet temperature to the preheater in a laboratory pressure bomb while maintaining sufficient pressure on the sample to prevent any substantial vaporization. The pressure is then slowly released from the sample while observing the liquid phase of the sample to determine the pressure at which incipient solidification occurs. This pressure is the minimum pressure to maintain at the inlet to the preheater 70.

Care must also be exercised to avoid heating the crude polymerizate to temperatures in excess of approximately 270 degrees C. as such elevated temperatures discolor the product. Efficient devolatilization, however, requires that the crude polymerizate be heated to about 240–250 degrees C. and, accordingly, the temperature limit between a successful efficient operation and an operation producing discolored polymer is very narrow.

The crude polymerizate is flashed into devolatilizer vessel 76 which is maintained at a subatmospheric pressure sufficient to strip nearly all of the solvent, unreacted monomer, comonomer and the low boiling polymer byproduct from the finished polymer product. Preferably a spray sparger 78 is used to insure intimate dispersion of the polymerizate into fine sheets or droplets for efficient devolatillization. Typically, the devolatilizer is maintained at an absolute pressure of from 10 to about 150 mm Hg., preferably at about 50 mm Hg. The vapors are removed from vessel 76 through a nozzle in its top dome and the vapors are passed by line 80 to recycle still 81, which is a column having two zones of packing 83 and 85 and a subjacent reboiler 87. The hot vapors are introduced beneath the lower packed zone 85 and are partially condensed by contact with recycled condensate from lines 86 and 91. The rate of refluxed condensate through line 86 is controlled by valve 79 to maintain a preselected liquid level in reboiler 87 Solvent, some monomer and the low boiling polymer products accumulate in reboiler 87 and a bleed stream of these is removed at 93.

The vapors from recycle still 81 are passed by line 95 to the reflux condenser 82. The reflux condenser 82 is a shell and tube heat exchanger and the solvent vapors are condensed and collected in reflux accummulator vessel 84. The noncondensibles are passed by line 97 to the vacuum system 40 through control valve 99. A portion of the condensed solvent is returned to the recycle still as reflux through line 86 while the remainder of the condensed solvent is recycled to the process through line 30, completeing the solvent loop of the process. The finished polymer, which typically has a residual monomer and solvent content less than about 1.0 weight percent, preferably less than 0.1 weight percent, is withdrawn from the bottom of the devolatilizer vessel 76 through polymer pump 75 and is passed to the finishing treatment. In the finishing treatment, the polymer is blended with additives which are introduced by line 89 through injector nozzle 88 and intimately mixed by passage through static mixer 90, a commercially available unit having a plurality of successive, oppositely curved, stationary blades. The aforementioned elastomeric modifier can be added at this point, or other additives such as ultra violet stabilizers, antioxidants, internal lubricants/processing aids, thermal stabilizers, dyes/optical brighteners and plasticizers can be added at conventional concentrations. The polymer is forced through a screen 92 to remove particulate contaminates and the filtered polymer is then extruded through die 94 in the form of a plurality of strand of molten polymer and the strands of extruded polymer are passed through water bath 96 to solidify the polymer. The solidified polymer is then passed through water stripper 98 which removes residual moisture and serves to further cool the polymer strands 100 that are passed to a pelletizing station 102 where the polymer strands are cut into pellets 104 suitable for use in plastics fabricating equipment such as extrusion and injection molding equipment.

The invention has been described with reference to the illustrated and presently preferred embodiment. It is not intended that the invention be unduly limited by this disclosure of preferred embodiments. Instead it is intended that the invention be defined by the means, and steps, and their obvious equivalents set forth in the following claims.

What is claimed is:

1. A continuous solution process for the polymerization of monomers comprising at least 40 percent arylate esters of $C_1$ to $C_8$ alkanols which comprises:

(a) introducing monomer, initiator and chain transfer agent into admixture with solvent to provide a polymerization medium containing not less than 40 weight percent solvent;
    (b) maintaining said polymerization medium under polymerization conditions, in at least one polymerization reactor comprising a temperature from 60 to about 130 degrees C. and sufficient residence time to effect 20 to 95 percent of the total conversion of said monomer and form a crude intermediate polymerizate;
    (c) withdrawing said crude, intermediate polymerizate and passing it to at least one succeeding polymerization reactor, including a final polymerization reactor;
    (d) stirring said crude intermediate polymerizate in said succeeding polymerization reactor, including said final polymerization reactor, to maintain said polymerizate intimately admixed while maintaining polymerization conditions therein comprising a temperature from 60 to about 130 degrees C., and sufficient residence time to essentially deplete the initiator in said polymerizate, thereby forming, and pumping a crude polymerizate containing solvent, unreacted monomer and less than about 50 weight percent polymer from said final polymerization reactor;
    (e) heating said crude polymerizate in a devolatilzer preheater to a temperature between 200 degrees and 270 degrees C., withdrawing the preheated crude polymerizate from said preheater and passing it through a transfer line to a devolatilizer and spraying said preheated polymerizate into said devolatilizer and, flashing the polymerizate therein to remove a volatile stream comprising solvent, unreacted monomer, and oligomers therefrom; and
    (f) maintaining a pressure on the crude polymerizate in said transfer line and said devolatilizer preheater which permits vaporization therein to form a mixed two-phase system of vapor and liquid, which pressure is sufficient to prevent incipient solidification in the liquid phase, thereby avoiding formation of foam encrustations on the heat exchange surfaces of said preheater, while heating said polymerizate sufficiently in said preheater to provide a preheated crude polymerizate with sufficient heat to supply the heat of vaporization necessary to produce said molten polymer and permit it to be pumped from said devolatilizer.

2. The process of claim 1 wherein said acrylate ester is methyl methacrylate.

3. The process of claim 2 wherein said moner is a mixture of from 80 to 99 percent methyl methacrylate and from 1 to 20 percent ethyl acrylate, methyl acrylate, or mixtures thereof.

4. The process of claim 1 wherein said solvent is toluene.

5. The process of claim 1 wherein said solvent is selected from the class consisting of benzene, alkyl benzenes with 6–10 total carbons, and mixtures thereof.

6. The process of claim 1 wherein said chain transfer agent is n-dodecyl mercaptan.

7. The process of claim 1 wherein said polymerization medium is intimately admixed to form a thermally and chemically homogeneous mass in all zones of polymerization.

8. The process of claim 1 wherein a portion of the vapors formed in the first polymerization zone is withdrawn, cooled and condensed and the resultant condensate is returned to said first polymerization zone to maintain said temperature.

9. The process of claim 9 including the application of a vacuum to said first polymerization zone and maintaining the pressure in said zones by passing vapors withdrawn from said zones through throttling valves.

10. The process of claim 1 wherein said crude polymerizate is heated by indirect heat exchange with heated heat transfer surfaces in said volatilizer preheater.

11. The process of claim 10 wherein said crude polymerizate is maintained under pressure during its heating to prevent formation of a solid phase during said heating step, thereby avoiding the formation of solid encrustations on said heat transfer surfaces.

12. The process of claim 1 including the step of adding from 5 to about 30 percent of the comonomers used in said process to said crude, intermediate polymerizate in said at least one succeeding polymerization zone including said last polymerization zone.

13. The process of claim 12 including the step of adding from 5 to about 30 percent of the chain transfer agent used in said process to said crude, intermediate polymerizate in said at least one succeeding polymerization zone, including said last polymerization zone.

14. The process of claim 1 including the step of adding to the polymerization medium a peroxy free radical scavenger in an amount from 0.05 to 0.5 weight percent based on said medium.

15. The process of claim 1 including the steps of:
(a) condensing said volatile stream to obtain a condensate comprising said solvent and unreacted monomer; and
(b) recycling said condensate to said first polymerization reactor as the source of solvent therein.

16. The method for the devolatilization of a crude polymerizate of poly(acrylate esters) containing solvent, unreacted monomer and less than about 50 weight percent polymer which comprises:

(a) heating said crude polymerizate by indirect heat exchange in a devolatilzer preheater to a temperature between about 200 and 270 degrees C.;
(b) controlling the pressure on the crude polymerizate in said devolatilizer preheater at a value which permits vaporization therein to form a mixed two-phase system of vapor and liquid, which pressure is sufficient to prevent incipient solidification in the liquid phase, thereby avoiding formation of foam encrustations on the heat exchange surfaces of said preheater, while heating said polymerizate sufficiently in said preheater to provide a preheated crude polymerizate with sufficient heat to supply the heat of vaporization necessary to produce said molten polymer and permit it to be pumped from said devolatilizer;
(c) passing said preheated polymerizate through a transfer line into a devolatilizer vessel and flashing the polymerizate therein to form a volatile stream comprising solvent, unreacted monomer, and oligomers; and
(d) withdrawing from the devolatilized a molten polymer containing less than 1.0 weight percent solvent and unreacted monomer.

17. The method of claim 16 including the step of condensing said volatile stream to obtain a condensate comprising said solvent and unreacted monomer.

18. The method of claim 16 wherein said crude polymerizate is heated in said preheater to a temperature from about 220° to 260° C.

19. The method of claim 16 wherein said crude polymerizate is discharged into said devolatilizer through a spray sparger into an intimate dispersion of fine sheets or droplets.

20. The method of claim 16 including the step of maintaining the devolatilizer at an absolute pressure from 10 to about 150 millimeters of mercury.

21. The method of claim 16 wherein said polymer is a copolymer of 80 to 99 percent methyl methacrylate and from 1 to 20 percent of methyl acrylate, ethyl acrylate, and mixtures thereof.

22. The method of claim 16 wherein said solvent is selected from the class consisting of benzene, alkyl benzenes with 6–10 total carbons, and mixtures thereof.

* * * * *

UNITED STATES PATENT AND TRADEMARK OFFICE
CERTIFICATE OF CORRECTION

PATENT NO. : 4,728,701

DATED : March 1, 1988

INVENTOR(S) : Marvin A. Jarvis & Lawrence A. Testa

It is certified that error appears in the above-identified patent and that said Letters Patent is hereby corrected as shown below:

Column 10, Claim 16, line 22, change "devolatilized" to --devolatilizer--.

Signed and Sealed this

Sixteenth Day of August, 1988

Attest:

DONALD J. QUIGG

Attesting Officer

Commissioner of Patents and Trademarks

UNITED STATES PATENT AND TRADEMARK OFFICE
CERTIFICATE OF CORRECTION

PATENT NO. : 4,728,701
DATED : March 1, 1988
INVENTOR(S) : Marvin A. Jarvis & Lawrence A. Testa It is certified that error appears in the above—identified patent and that said Letters Patent is hereby corrected as shown below:

In the Claims:

Claim 1, line 67, change "arylate" to --acrylate--

Claim 3, line 52, change "moner" to --monomer--

Claim 16, line 22, change "devolatilized" to --devolatilizer--

This certificate supersedes Certificate of Correction issued August 16, 1988.

Signed and Sealed this

Fourth Day of October, 1988

Attest:

DONALD J. QUIGG

*Attesting Officer*    *Commissioner of Patents and Trademarks*